United States Patent [19]

Koshi et al.

[11] Patent Number: 5,282,503

[45] Date of Patent: Feb. 1, 1994

[54] ANTI-SKID DEVICE FOR USE ON PNEUMATIC TIRES

[75] Inventors: Masaki Koshi, 4-40-1-601, Yoyogi, Shibuya-ku, Tokyo; Shouji Yamada, Shizuoka; Akihiko Watanabe, Shizuoka; Kouji Nemoto, Shizuoka, all of Japan

[73] Assignees: Sumitomo Wiring System, Ltd., Mie; Masaki Koshi, Tokyo, both of Japan

[21] Appl. No.: 846,581

[22] Filed: Mar. 3, 1992

Related U.S. Application Data

[62] Division of Ser. No. 634,734, Dec. 27, 1990, Pat. No. 5,147,479.

[30] Foreign Application Priority Data

Dec. 27, 1989 [JP] Japan .................................. 1-336343
Dec. 27, 1989 [JP] Japan .................................. 1-336344

[51] Int. Cl.$^5$ ............................................. B60C 27/00
[52] U.S. Cl. ..................................... 152/216; 152/170; 301/40.1; 301/41.1
[58] Field of Search ................ 152/167, 170, 178, 185, 152/186, 213 R, 216; 301/38 R, 40 R, 40 S, 41 R, 9 DN, 118

[56] References Cited

U.S. PATENT DOCUMENTS

| | | | |
|---|---|---|---|
| 1,928,882 | 10/1933 | Coppock | 301/37 S |
| 4,405,006 | 9/1983 | Preusker | 152/170 |
| 4,576,214 | 3/1986 | Preusker | 152/213 A |

FOREIGN PATENT DOCUMENTS

| | | |
|---|---|---|
| 0056130 | 7/1982 | European Pat. Off. . |
| 1368348 | 6/1964 | France . |
| 2116077 | 7/1972 | France . |
| 9006239 | 6/1990 | World Int. Prop. O. . |

Primary Examiner—Michael W. Ball
Assistant Examiner—Francis J. Lorin
Attorney, Agent, or Firm—Wenderoth, Lind & Ponack

[57] ABSTRACT

An anti-skid device for use on pneumatic tires of an automotive vehicle includes a supporting ring rotatably provided on the outer circumferential periphery of a mounting plate that is detachably mounted on the wheel portion of the automotive vehicle, a plurality of ribs formed from a material having elasticity and toughness that are provided on the supporting ring in a radial fashion and are bent so as to extend from the outer side of a pneumatic tire to a tread thereof, first and second endless bands provided on the leading-end portion of each of the ribs in such a manner as to be located within the width of the tread of said pneumatic tire, rivets secured at portions where the first and second bands intersect the ribs, and a counter-measure provided on either of the first and second bands for preventing an imbalance in the degree of stretch between the first and second bands. Insertion and fixation holes each including a large diameter portion and a small diameter portion are formed in the mounting plate with the large diameter portions being designed to be opened and/or closed by stoppers after the leading-end portions of wheel nuts of the automotive vehicle have been put through the large diameter portions so as to be then moved to the small diameter portions to be secured in place therein.

1 Claim, 7 Drawing Sheets

ANTI-SKID DEVICE FOR USE ON PNEUMATIC TIRES

This is a divisional application of Ser. No. 07/634,734, filed Dec. 27, 1990 now U.S. Pat. No. 5,147,479

BACKGROUND OF THE INVENTION

1. Field of the Invention

The present invention relates to an anti-skid device intended to be mounted on pneumatic tires of an automotive vehicle so as to prevent the slippage of the tires that would be caused when running on snowy, icy or sandy roads.

2. Statement of the Prior Art

It is known that anti-skid devices comprising chains or formed from rubber or synthetic resin have been in use for preventing the slippage of the pneumatic tires of automotive vehicles that would be caused when running on snow-covered, ice-covered or sandy roads.

Japanese Patent Laid-Open No. 18308/1987 discloses a chain attachment and detachment device that allows a driver to attach and detach chains to and from the pneumatic tires of his/her automotive vehicle while he/she remains in the driver's seat.

however, it has been found that it takes a lot of time and labor to mount and dismount the above-mentioned anti-skid devices comprising chains or formed from rubber or synthetic resin.

With the anti-skid device of the latter type, having the chain attachment and detachment device, although the driver can attach and detach chains to and from the pneumatic tires of the automotive vehicle from the driver's seat, the construction of the device is complicated.

SUMMARY OF THE INVENTION

A principal object of the present invention is to provide an anti-skid device for use on pneumatic tires of an automotive vehicle that is simple in construction and easy to mount and dismount to and from the pneumatic tires of an automotive vehicle.

Another object of the present invention is to provide an anti-skid device for use on pneumatic tires of an automotive vehicle that is easy to mount and dismount to and from the pneumatic tires of the automotive vehicle and has improved serviceability, thereby allowing the driver to quickly mount the devices on the pneumatic tires of his/her automotive vehicle even if it starts to snow heavily with short notice or to mount the devices on the pneumatic tires within a short period of time when necessary while driving in a mountainous area.

A further object of the present invention is to provide an anti-skid device for use on pneumatic tires of an automotive vehicle that will not become dismounted unexpectedly even when the automotive vehicle is abruptly started or brought to a halt, or driven along a sharp curve in a road.

According to the present invention, the above-mentioned objects will be attained by means of an anti-skid device for use on pneumatic tires of an automotive vehicle comprising a supporting ring rotatably provided on the outer circumferential periphery of a mounting plate that is detachably mounted on a wheel of the automotive vehicle, a plurality of ribs formed from a material having elasticity and toughness that are provided on the supporting ring in a radial fashion and are bent so as to extend from the outer side of the pneumatic tire to the tread thereof, first and second endless bands provided on the leading-end portion of each of the ribs in such a manner as to be located within the width of the tread of the pneumatic tire, rivets secured at portions where the first and second bands intersect the ribs, and a prevention means provided on either of the first and second bands for preventing the occurrence of imbalance of the degree of stretch between the first and second bands.

According to the anti-skid device of the present invention, the mounting of the bands around the entire circumference of a pneumatic tire can be attained by allowing the elasticity inherent in the ribs to locate each rib on the tread of the pneumatic tire by slightly rotating the pneumatic tire after the mounting plate has been mounted on the outer surface of a wheel of an automotive vehicle, while the dismounting of the device can be attained by slightly rotating the pneumatic tire after the mounting plate has been dismounted from the wheel. In addition, since there are provided the first and second bands, the torsion of the two bands is prevented. Moreover, the magnitude of resistance that is exerted on the first and second bands when the automotive vehicle is driven on a road with the two bands being in contact with the ground is balanced by means of the prevention means for preventing an imbalance in the degree of stretch between the first and second bands.

Furthermore, according to the present invention, the aforementioned objects of the present invention can be attained by an anti-skid device for use on pneumatic tires of an automotive vehicle wherein insertion and fixation holes each comprising a small diameter portion and a large diameter portion are provided in the mounting plate with the respective large diameter portions being designed to be opened and/or closed by means of stoppers after the leading-end portions of wheel nuts have been put through the large diameter portions to be then moved to the small diameter portions, whereby with the large diameter portions being closed by means of the stoppers the mounting plate is solidly secured to the wheel via the wheel nuts, while with the large diameter portions being opened by releasing the stoppers therefrom the mounting plate is dismounted from the wheel.

A retaining mechanism can be provided which opens or closes the large diameter portions of the insertion and fixation holes.

According to the anti-skid device of the present invention, in order to mount the anti-skid mechanism on a pneumatic tire of an automotive vehicle, the mounting plate is placed so as to confront the wheel on which the pneumatic tire is mounted while grasping an operation frame and a handle frame together, and the operation frame is then grasped further strongly so as to keep the stoppers out of the large diameter portions so that the leading-end portions of the wheel nuts are put through the large diameter portions to be then moved to the small diameter portions for fixation therein, and finally the operation frame is released so as to allow the stoppers to fit in the large diameter portions, thereby making it possible to solidly hold the mounting plate on the wheel via the wheel nuts.

In contrast, in order to dismount the mounting plate from the wheel, in other words, in order to release the mounting plate from the mounted state, the operation and handle frames are strongly grasped together so as to move the stoppers out of the large diameter portions, and the mounting plate is then slightly rotated so as to allow the leading-end portions of the wheel nuts to move from the small diameter portion to the large diameter portion, thereby making it possible to pull the mounting plate so as to separate from the wheel.

DETAILED DESCRIPTION OF THE PREFERRED EMBODIMENTS

Referring to the drawings, embodiments of an anti-skid device according to the present invention which is intended for use on pneumatic tires of an automotive vehicle will be described.

Figure 1:
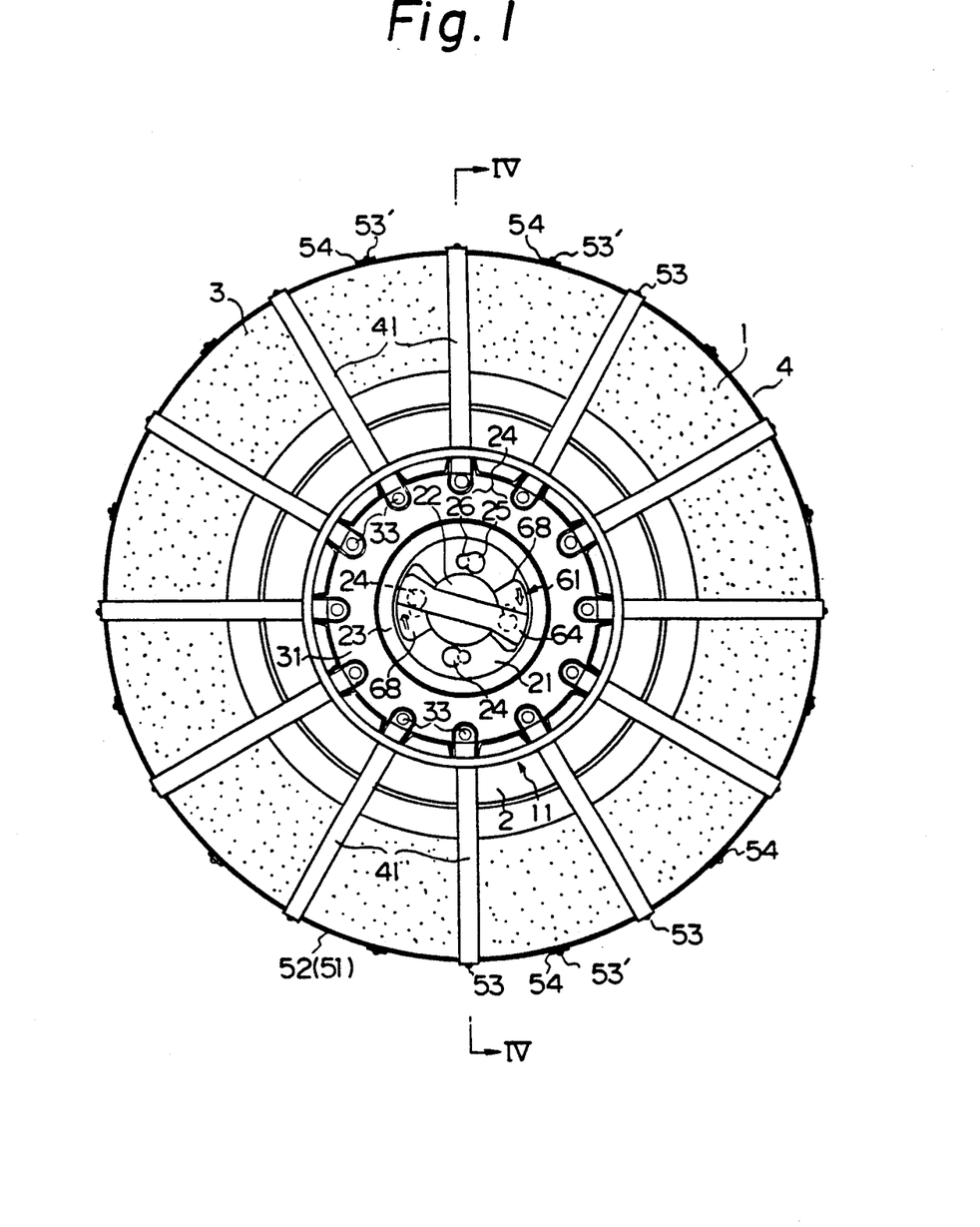
FIG. 1 is a front view of one embodiment of an anti-skid device according to the present invention mounted on a pneumatic tire.
Figure 2:
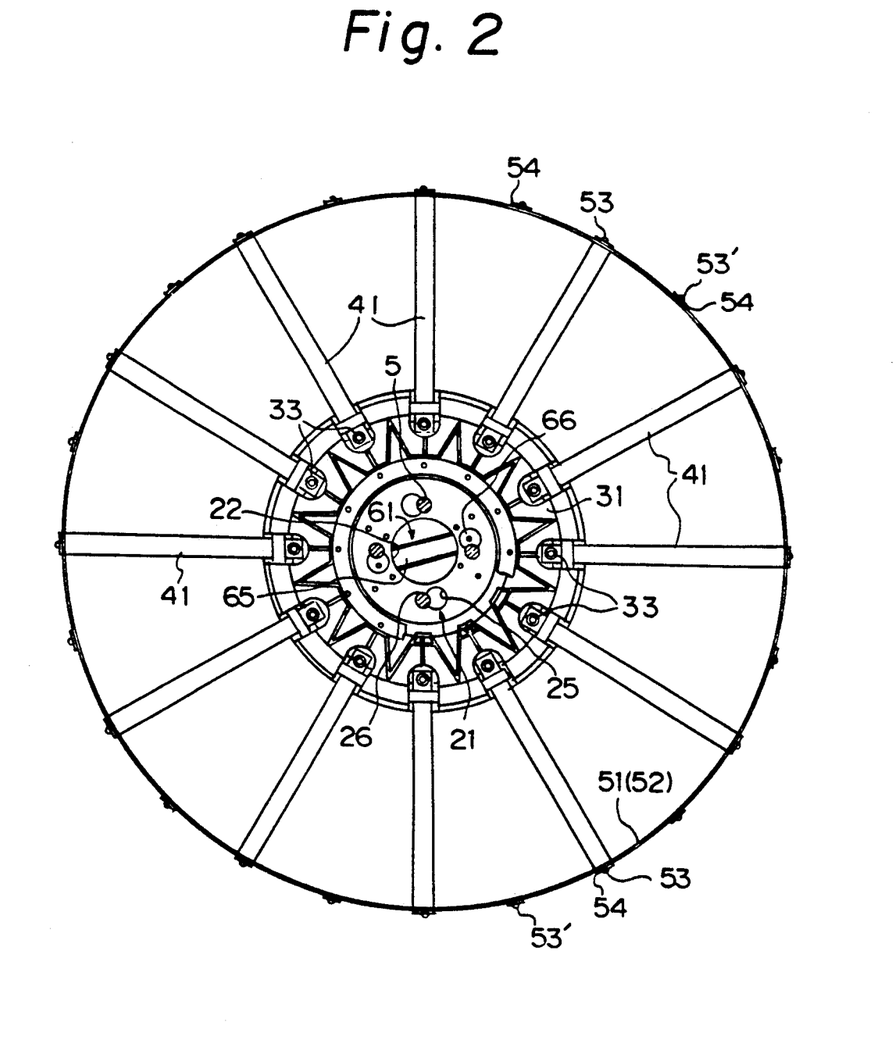
FIG. 2 is a view as seen from the backside of FIG. 1 with a portion thereof being taken away.
Figure 3:
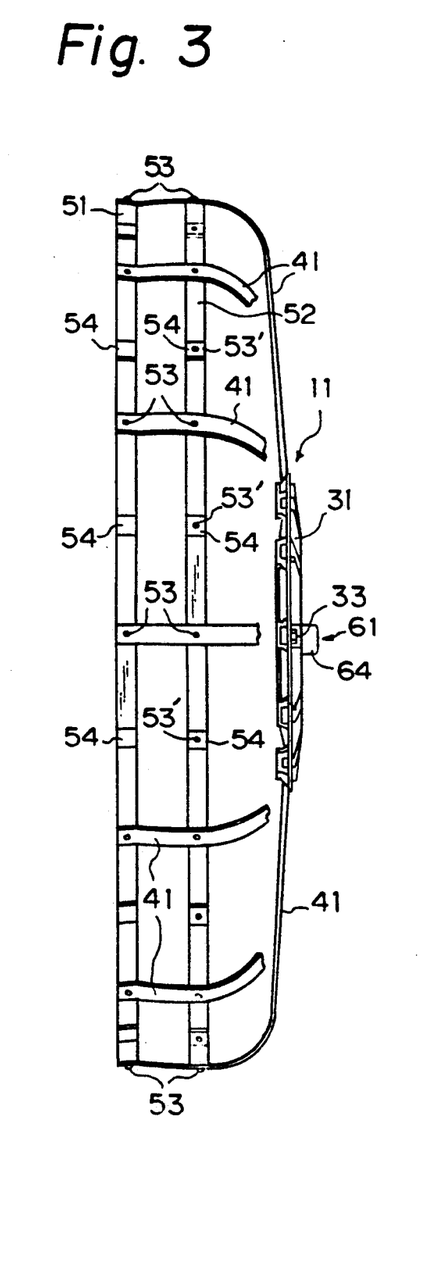
FIG. 3 is a side view of the anti-skid device shown in FIG. 1.
Figure 4:
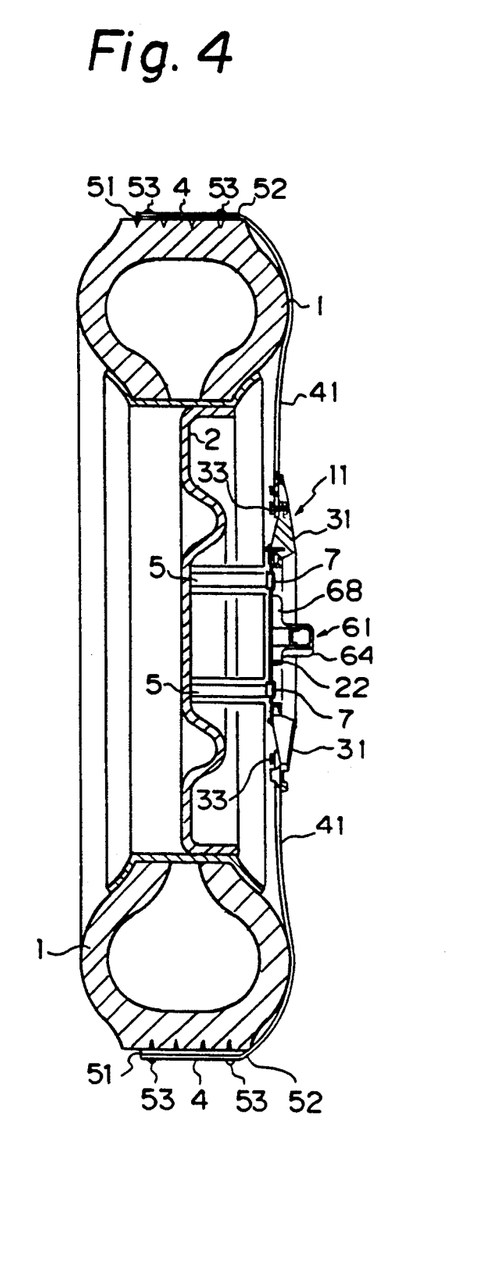
FIG. 4 is a vertical sectional view taken along line IV—IV of FIG. 1.
Figure 6:
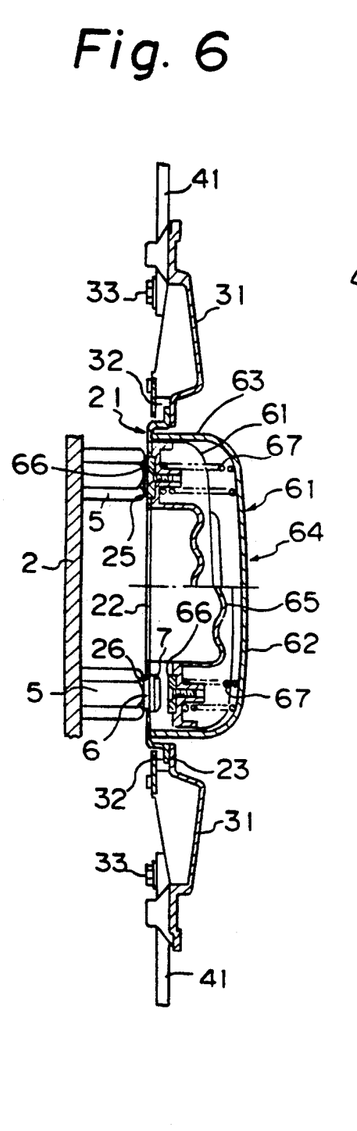
FIG. 6 is an enlarged vertical sectional view of a part of the anti-skid device shown in FIG. 4.
Figure 7:
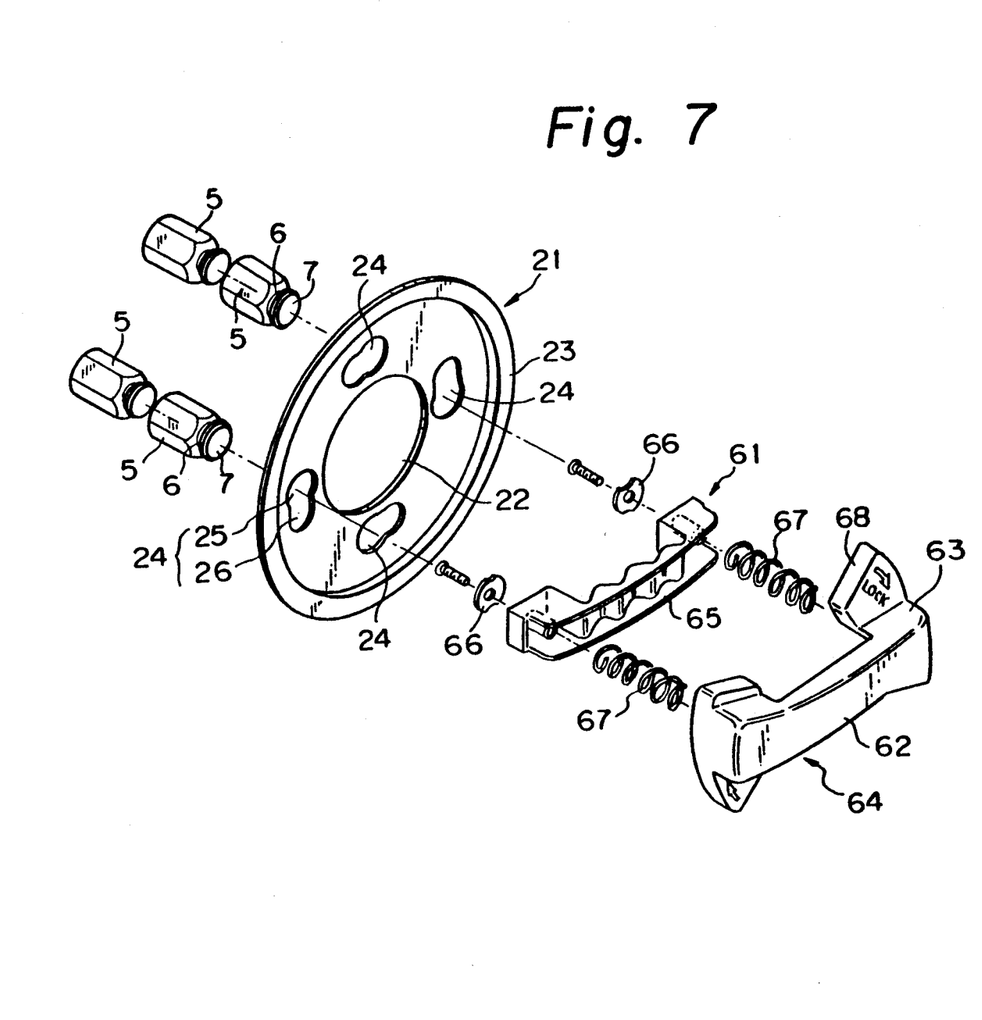
FIG. 7 is an exploded perspective view of the components shown in FIG. 6.

As is best seen in FIGS. 1 to 3, in an anti-skid device 11 according to the present invention which is intended for use on pneumatic tires of an automatic vehicle, a supporting ring 31 is rotatably provided on the outer circumferential periphery of a supporting plate 21 which is in turn detachably mounted on a wheel 2 of a pneumatic tire 1 of an automotive vehicle. A plurality of ribs 41 each formed from a material having elasticity force and toughness such as urethane elastomer are provided on the supporting ring 31 in a radial fashion, and the ribs are bent so as to extend from the outer side surface 3 of the pneumatic tire 1 toward the tread 4 thereof. A first endless band 51 and a second endless band 52 are provided on the leading-end of each of the ribs 41 in such a manner as to be located within the width of the tread 4 of the pneumatic tire 1. The wheel 2 of the automotive vehicle is, as shown in FIGS. 6 and 7, solidly secured to a disk (not shown) by means of wheel nuts 5 in a known manner, and in the present invention, a cap nut having an annular groove 6 formed in the leading-end thereof is used as the wheel nut 5.

The mounting plate 21 is an annular disk having a through hole 22 formed at the center thereof, and this mounting plate 21 has a flange portion 23 provided on the outer circumferential periphery thereof in such a manner as to rise in a stepped fashion and insertion and fixation holes 24 equidistantly formed in the circumference thereof, the number of the insertion and fixation holes 24 corresponding to the number of the wheel nuts used.

These insertion and fixation holes 24 each have a gourd-like shape comprising a large diameter portion 25 and a small diameter portion 26. The large diameter portion 25 allows the passage of the leading-end portion 7 of the wheel nut 5, while the small diameter portion 26 does not allow the passage of the same, being designed to fit in the annular groove 6 of the wheel nut 5.

A retaining mechanism 61 is provided on the outer surface of the mounting plate 21.

This retaining mechanism 61 comprises a handle frame 64 constituted by a grip section 62 and leg sections 63, and an operation frame 65. This handle frame 64 is hollow and made open on one side thereof, whereby the operation frame 65 is movably received therein along the leg sections 63. A stopper 66, which is designed to fit in the large diameter portion 25, is provided on each end of the operation frame 65, and a coil spring 67 is provided in each of the leg sections 63 so that the operation frame 65 is biassed to project from the open ends of the leg sections 63. This retaining mechanism 61 is mounted on the outer surface of the mounting plate 21 such that the stoppers 66 fit in the large diameter portions 25 of the two diametrically opposing insertion and fixation holes 24. In this construction, in a normal state, since the operation frame 65 is biassed by virtue of the biassing force exerted by the two coil springs 67 from the inside of the handle frame 64 toward the mounting plate 21, the respective stoppers 66 fit in the associated large diameter portions 25 of the insertion and fixation holes 24 to close the same (refer to the upper half portion of FIG. 6). However, when grasping the operation frame 65 so as to slide it into the handle frame 64, the stoppers 66 are moved out of the large diameter portions 25 of the insertion and fixation holes 24, whereby the large diameter portions are opened (refer to the lower half portion of FIG. 6). Each leg section 63 of the handle frame 64 has at the open leading-end portion thereof a base frame portion 68, the front side of which is made open, and these base frame portions 68 cover the associated insertion and fixation holes 24 when the retaining mechanism 61 is properly mounted on the outer surface of the mounting plate 21.

Figure 5:
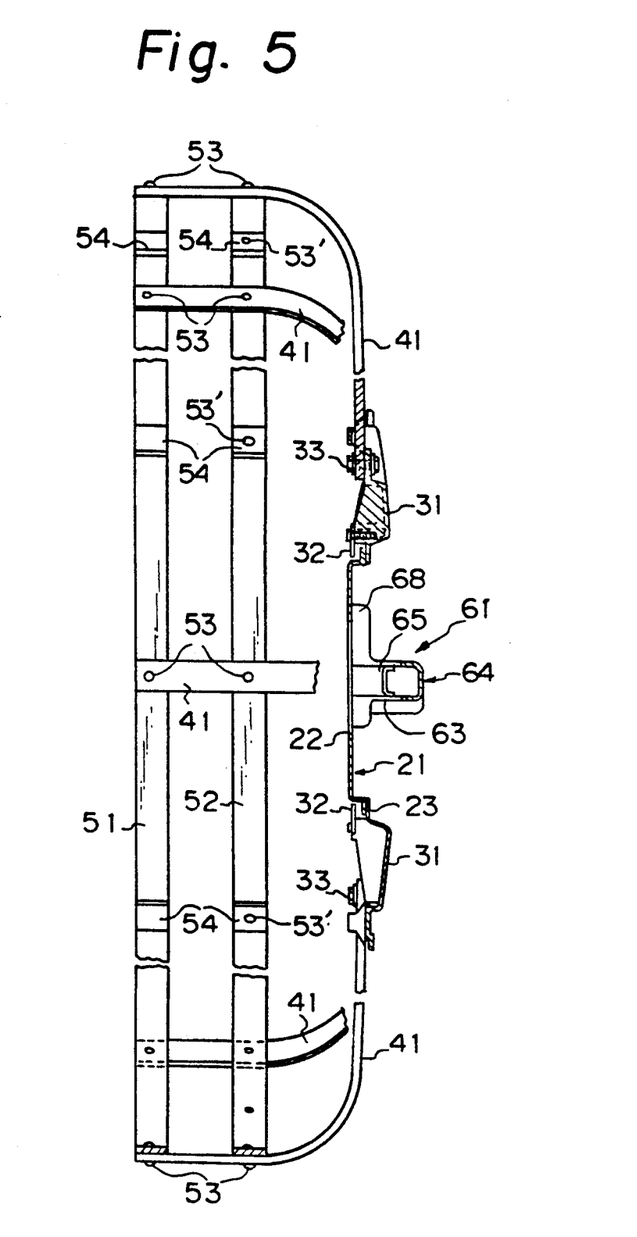
FIG. 5 is an enlarged side view, partially broken away, of the anti-skid device shown in FIG. 1

The supporting ring 31 may be a plate-like ring formed from a rigid synthetic resin or metal. As is shown in FIGS. 5 and 6, an annular groove 32 is formed in the inner circumferential periphery of the supporting ring 31 so that the flange portion 23 of the mounting plate 21 is loosely mounted therein, and a plurality of mounting machine screws 33 are exchangeably planted in the outer circumferential periphery of the supporting ring 31. As is shown in FIGS. 2 and 6, the thin batten-like ribs 41 formed from a material having elasticity and toughness such as urethane elastomer are secured by means of the respective mounting machine screws 33 at the proximal ends thereof and are allowed to extend in a radial fashion, and as shown in FIGS. 3 and 5, the first and second endless bands 51, 52 are provided on the leading-end portions of the respective ribs 41.

Similarly to the ribs 41, these first and second bands 51, 52 are also formed into a batten shape from a material having elasticity and toughness such as urethane elastomer, and they are located within the width of the tread 4 of the pneumatic tire 1. Thus, each rib 41 extends along the outer side surface 3 of the pneumatic tire 1 and is bent such that it further extends from the outer side surface 3 over the tread 4, and the first and second bands 51, 52 extend along the outer circumferential surface of the tread 4.

According to the present invention, each rib 41 intersects the first and second bands 51, 52 at the leading-end portions, where the rib and the bands are secured to each other, and a rivet 53 is secured to the outer surface of such secured portions. In addition, a sleeper member 54 equal to the rib 41 in thickness is provided on the outer surface of the respective bands 51, 52 at an intermediate position thereof between the adjacent ribs 41 that intersect the two bands, and a rivet 53' is provided only on the outer surfaces of the respective sleeper members 54 provided on the second band 52 that is located closer to the mounting plate 21 than the first band 51 (the outer side relative to the pneumatic tire) as a prevention means for preventing an imbalance of the degree in stretch between the first and second bands 51, 52 when running the automotive vehicle. The above sleeper members may be formed from a urethane elastomer as used for the ribs and bands.

Thus, the ribs 41 and sleeper members 54 having substantially the same thickness are provided on the outer surfaces of the two bands 51, 52 to be secured thereto in an alternate fashion, and with the first band 51 the rivets 53 are provided only on the portions where the band 51 intersects the ribs 41, while with the second band 52 the rivets 53, 53' are provided on the portions where the band 52 intersects the ribs 41 the sleeper members 54, respectively, and this results in the fact that a greater number of rivets are provided on the outer circumferential surface of the second band 52 than on that of the first band 51.

Figure 9:
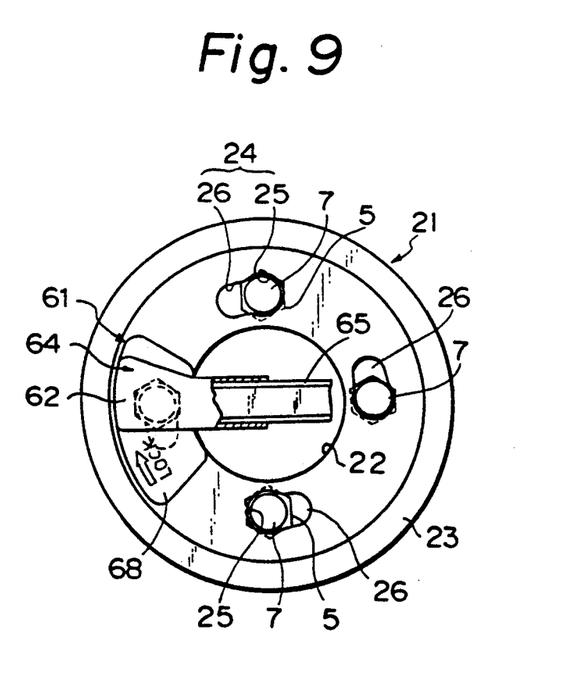
FIG. 9 is a front view, partially broken away, of a retaining mechanism showing a state in which the retaining mechanism is mounted and/or dismounted.
Figure 10:
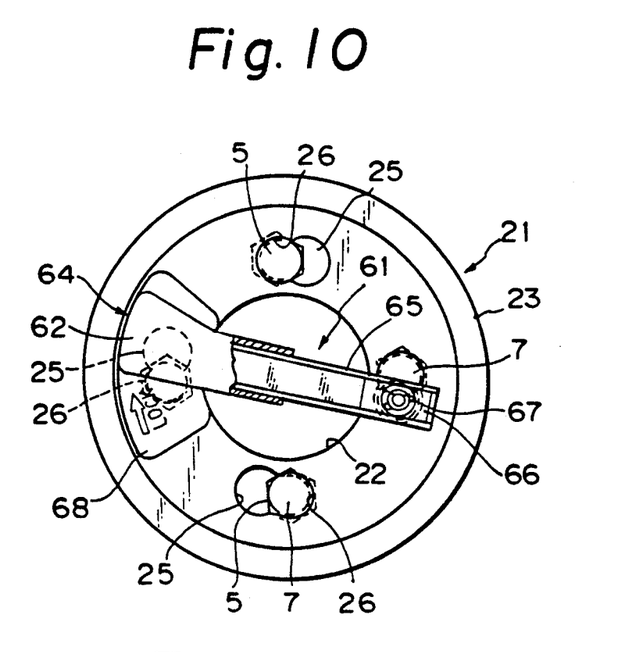
FIG. 10 is a front view, partially taken away, of the retaining mechanism showing a state in which the same mechanism is locked.

In order to mount the anti-skid device 11 according to the present invention on the pneumatic tire 1, the mounting plate 21 is placed to confront the wheel 2 with the grip section 62 of the handle frame 64 of the retaining mechanism 61 being grasped so as to allow the operation frame 65 to slide thereinto so that the respective stoppers 66 are moved from the open end side of the leg sections 63 toward the inside thereof (the lower half portion of FIG. 6). Then, the respective insertion and fixation holes 24 are arranged so as to confront the leading-end portions 7 of the wheel nuts 5, and after the leading-end portions 7 have been put through the large diameter portions 25 (FIG. 9), the mounting plate 21 is rotated in a clockwise direction as viewed in the drawing by means of the handle frame 64 so that the annular grooves 6 of the respective wheel nuts 5 (refer to FIG. 7) fit in the smaller diameter portions 26 (FIG. 10), and the operation frame 65 is then released so that the stoppers 66 fit in the large diameter portions 25 by virtue of the biasing force of the coil springs 67 (the upper half portion of FIG. 6).

Thus, the large diameter portions 25 are closed in a state in which the annular grooves 6 fit in the small diameter portions 26, and this prevents the detachment of the mounting plate 21 from the wheel nuts 5, whereby the anti-skid device 11 is firmly held to the wheel 2.

In this state, although the first and second bands 51, 52 are placed on substantially the entire outer circumferential surface of the pneumatic tire 1, the first and second bands 51, 52 are not allowed to be placed on the tread 4 of the pneumatic tire 1 at the portion where the pneumatic tire 1 contacts the ground. However, when running the automotive vehicle by a distance that allows a rotation of the pneumatic tire 1, the ribs 41, first band 51 and second band 52 are then allowed to be mounted on the tread 4, whereby the first and second bands 51, 52 are mounted on the entire circumferential surface of the pneumatic tire 1. When running the automotive vehicle on a snow-covered, ice-covered or sandy road in this state, therefore, since the leading-end portions of the ribs 41, the first band 51 and the second band 52 are mounted on the tread 4 of the pneumatic tire 1, any slippage of the automotive vehicle is prevented. Moreover, since the supporting ring 31 is free to rotate relative to the mounting plate 21, which is mounted on the wheel of the automotive vehicle, the ribs 41, first band 51 and second band 52 rotate based on the ground-contact resistance of the pneumatic tire 1 when running the automotive vehicle. In this case, since the first and second bands 51, 52 are also placed on the portion where the pneumatic tire contacts the ground, there is no risk of the respective bands being subject to torsion due to the rotation of the pneumatic tire.

In contrast, in order to dismount the anti-skid device from the pneumatic tire 1, an operation reverse to what has been described above is performed. In other words, the handle frame 64 of the retaining mechanism 61 is grasped so as to move the operation frame 65 (the lower half portion of FIG. 6), and when the stoppers 66 have been moved out of the large diameter portions 25 of the insertion and fixation holes 24, the mounting plate 21 is then rotated in a counterclockwise direction as viewed in the drawing (FIG. 9) so that the annular grooves 6 of the wheel nuts 5 are moved from the small diameter portions 26 to the large diameter portions 25, where the mounting plate 21 can be pulled to be separated from the wheel 2. Thus, most of the ribs 41, and first and second bands 51, 52 are dismounted from the pneumatic tire 1 except those on that portion of the pneumatic tire 1 which is in contact with the ground. However, when slightly moving the automotive vehicle so as to change the ground-contacting portion of the pneumatic tire, the first and second bands 51, 52 can be completely dismounted from the pneumatic tire 1.

Consequently, since it is very simple to mount and dismount the anti-skid device 11 of the present invention on and from the pneumatic tire, even a person who is not accustomed to the mounting and dismounting operation of an anti-skid device can easily accomplish the mounting and dismounting operation.

While running the automotive vehicle, the two bands 51, 52 are not in tight contact with the tread 4 of the pneumatic tire 1 along the entire circumferential surface thereof. The tread 4 of the pneumatic tire 1, the first and second bands 51, 52 and the ground are brought into pressing contact with each other only at the underside of the pneumatic tire where it contacts the ground, and as the pneumatic tire rotates, the two bands 51, 52 rotate while following the rotating pneumatic tire due to the press contacting force and the ground-contacting resistance. Therefore, when the automotive vehicle is driven on a straight road, there is little difference in force exerted on the two bands 51, 52. However, in a case, for example, where the automotive vehicle makes a right turn or a left turn, a greater force is exerted on the first band 51 provided on the inner side of the tread of the pneumatic tire than on the second band 52 due to the inner or outer wheel difference, whereby there is a possibility that the first band is stretched longer than the second band. The same thing takes place due to the contacting condition between the pneumatic tire and the road surface in a case where the automotive vehicle is abruptly started or brought to a halt.

In order to cope with this, more rivets are provided on the second band 52 by the number equal to that of the rivets 53' provided thereon than on the first band 51 as prevention means for preventing an imbalance in the degree of stretch between the first and second bands 51, 52. With this construction, when driving the automotive vehicle along curves, the ground-contacting resistance applied to the second band 52 is increased, and this makes the stretching force applied to the second band 52 greater than that applied to the first band 51, whereby the stretching force applied to the two bands are eventually balanced at a substantially equal level, thereby making it possible to prevent the detachment of the bands from the pneumatic tire, as well as the distortion and torsion thereof.

Figure 8:
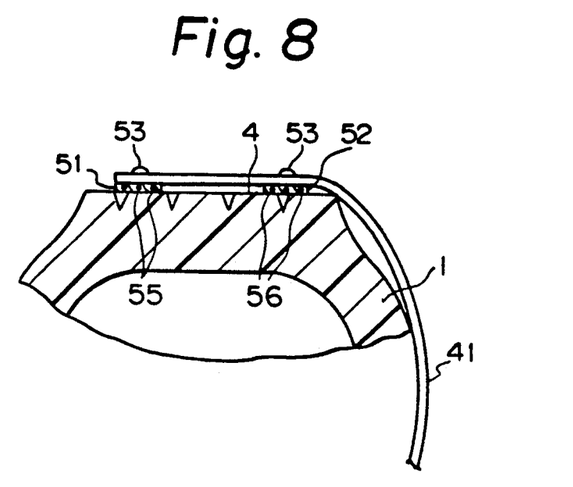
FIG. 8 is an enlarged sectional view of a part of the anti-skid device shown in FIG. 4.

In another embodiment shown in FIG. 8, reinforcing fibrous wires embedded in the bands are used as a prevention means for preventing the occurrence of imbalance of the degree of stretch between the first band 51 and the second band 52, and the reinforcing fibrous wires 55 embedded in the first band 51 are constituted by a material having less stretchability than that of a material constituting the reinforcing fibrous wires 56 embedded in the second band 52.

It is generally known that in order to manufacture synthetic resin products requiring extremely high strength, fibrous wires and so forth are embedded in products while forming the same.

In the anti-skid device according to the present invention, since a greater stretching force is exerted on the first band 51 provided on the inner side than the second band 52 provided on the outer side when the automotive vehicle makes a right turn or a left turn, or when it is abruptly started or brought to a halt, reinforcing fibrous wires 55 to be embedded in the first band 51 should have a stretchability lower than that of reinforcing fibrous wires 56 to be embedded in the second band 52. With this construction, even when a greater stretching force is exerted on the first band 51, the reinforcing fibrous wires 55 can serve to suppress the stretch of the band that would be otherwise caused by the greater stretching force, thereby making it possible to balance the stretching force exerted on the second band 52 with that exerted on the first band 51.

Thus, the reinforcing fibrous wires embedded in the bands can serve as a prevention means for preventing an imbalance of the degree in stretch between the first and second bands by properly selecting materials for the reinforcing fibrous wires from a stretch-properties point of view.

Figure 11:
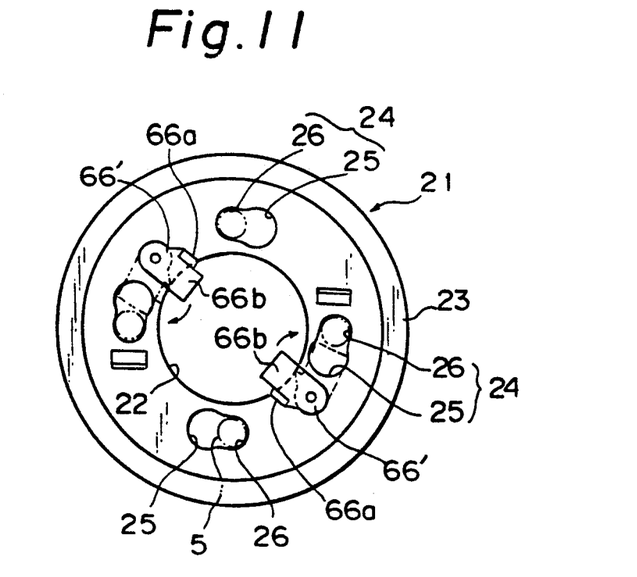
FIG. 11 is a front view of another embodiment of the mounting plate.

FIG. 11 shows another embodiment of the mounting plate 21 according to the present invention, wherein stoppers 66' each rotatably supported at one end thereof are provided so as to face, respectively, the two diametrically opposing insertion and fixation holes 24 of the mounting plate 21.

Each stopper 66' is formed into a flat plate and has on one side edge thereof an operation piece 66a outwardly projecting therefrom, and the stopper 66' is rotated by means of this operation piece 66a between two positions where the leading-end portion 66b thereof, which is not supported, is kept out of the large diameter portion 25 of the insertion and fixation hole 24, leaving the same portion open (solid-lined portions in FIG. 11) and where the leading-end portion 66b closes the large diameter portion 25 (dot-lined portions in FIG. 11).

In this construction, in a state in which the stoppers 66' are kept out of the large diameter portions 25, leaving the same portions open, the annular grooves 6 of the respective wheel nuts 5 are moved from the large diameter portions 25 of the insertion and fixation holes 24 to the small diameter portions 26 thereof so as to fit therein, and afterwards the stoppers 66' are rotated so as to close the large diameter portions 25, whereby the mounting plate 21 is firmly secured to the wheel of the automotive vehicle via the wheel nuts 5. In contrast, the stoppers 66' are rotated so as to open the large diameter portions 25 of the insertion and fixation holes 24 in a state in which the mounting plate 21 is supported on the wheel, whereby the mounting plate 21 is dismounted from the respective wheel nuts 5 only by rotating the same plate.

In the above construction, although the stoppers 66' may be arranged so as to confront the respective insertion and fixation holes of the mounting plate 21, it is possible to firmly secure the mounting plate 21 to the wheel 2 by providing only two stoppers 66' for one pair of the diametrically opposing insertion and fixation holes.

It is noted that in FIG. 11 like reference numerals are used to designate like constituent components that have already been described in the previous embodiments, and that a description of those constituent components is therefore omitted.

What is claimed is:

1. An anti-skid device for use on pneumatic tires of an automotive vehicle, comprising:

a mounting plate having insertion/fixation holes extending therethrough, each of said insertion/fixation holes including contiguous large-diameter and small-diameter portions;

a supporting ring rotatably provided on the outer circumferential periphery of said mounting plate;

anti-skid members provided on said supporting ring; and a retaining mechanism capable of detachably securing said mounting plate to the wheel of a vehicle, said retaining mechanism including a first frame fixed to said mounting plate and defining a hollow space therein confronting said mounting plate, an operation frame disposed within said hollow space and movable relative to said first frame in directions toward and away from said mounting plate, said first frame and said operation frame forming a handle which can be gripped, biasing means for biasing said operation frame toward said mounting plate, and stoppers fixed to said operation frame so as to be movable therewith, each of said stoppers being of such a size as to be receivable within the large-diameter portion of a respective said insertion/fixation hole, said operation frame being movable against the biasing force exerted by said biasing means from a position at which the stoppers are respectively received in the large-diameter portions of respective ones of said insertion/fixation holes to a position at which the stoppers are altogether out of the insertion/fixation holes.

* * * * *